Feb. 21, 1928. 1,659,654
C. W. HAZELETT
METHOD OF MAKING STORAGE BATTERY PLATES
Original Filed Feb. 21, 1921
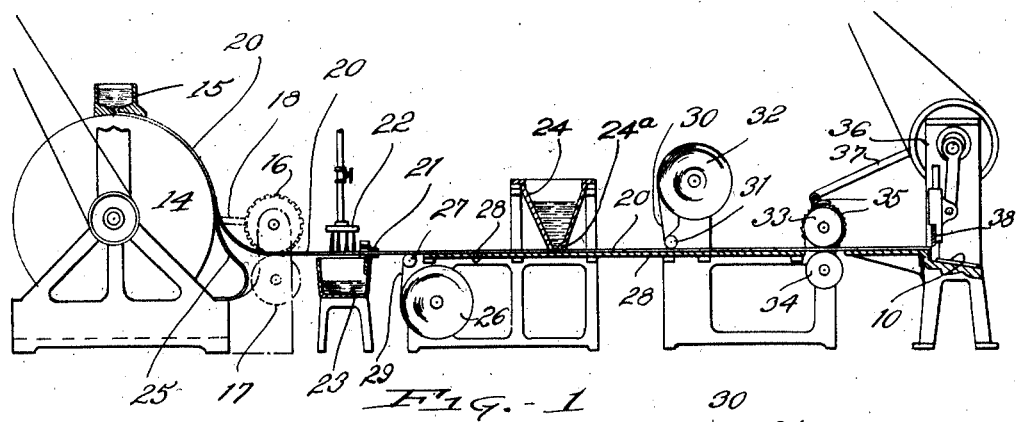
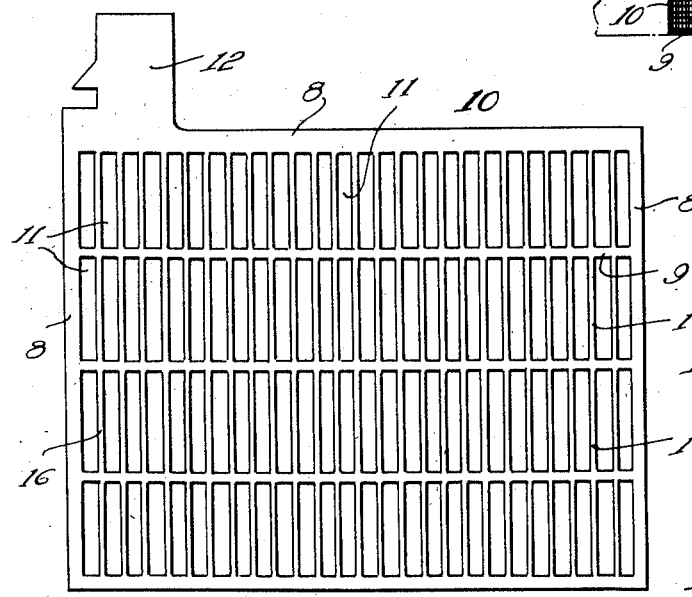
INVENTOR
Clarence W. Hazelett
By Bates & Machlin
ATTORNEYS Patented Feb. 21, 1928.

1,659,654

UNITED STATES PATENT OFFICE.

CLARENCE W. HAZELETT, OF LAKEWOOD, OHIO, ASSIGNOR TO THE HAZELETT STORAGE BATTERY COMPANY, OF CLEVELAND, OHIO, A CORPORATION OF OHIO.

METHOD OF MAKING STORAGE-BATTERY PLATES.

Original application filed February 21, 1921, Serial No. 446,768. Divided and this application filed June 28, 1923. Serial No. 648,205.

This invention relates to the process of manufacturing storage batteries such as is set forth in my application, Serial No. 446,768, filed February 21st, 1921, entitled "Process of making storage battery" and the present application constitutes a division thereof.

The general object of the present invention is the provision of a process for manufacturing storage battery plates whereby various economies are effected in the plate construction to involve the use of only a minimum amount of material, whence the process greatly simplifies the various steps of manufacturing and assembling storage battery plates.

The present process is particularly concerned with the manufacture of storage battery plates having the characteristics of the plates shown, described and claimed in my copending application, filed February 21st, 1921, Serial No. 446,767 entitled "Storage battery".

It has heretofore been considered necessary, in the design and production of storage batteries to make the plates of such form that they would have paste-retaining ribs or equivalent means which would overhang and retain the paste while in use in the battery. This practice resulted in the necessary use of thick grids and it has accordingly been considered as commercially impractical to make plates of less than one-eighth of an inch in thickness, due to this necessity of incorporating paste-retaining means in the plate structure. I have found however, that it is quite practical to construct a battery having unusually thin grids provided with mechanically formed interstices of sufficient dimensions to receive the proper amount of paste without resorting to the practice of providing conformations and other paste holding elements formed integrally on the plate for retaining the paste, my battery construction being such that the paste is effectively retained in place without paste-holding means being provided on the plates themselves. Accordingly, I am enabled to manufacture plates of such extreme thinness that they may properly be referred to as "leaf-lead plates". It is preferable however to form these plates of crystalline or cast material (at least for the positive plates), as rolled leaf-lead has a tendency to expand or grow longitudinally of the grain when in use in the battery.

The particular object of the present invention therefore, is the provision of a process for manufacturing storage battery plates of the character referred to, whereby the plates are formed in continuous cast sheets which are contoured, perforated, pasted and then sheared into units while retaining the individual plates in these continuous strips.

Various specific objects are incident to the carrying out of my process, one of which is to overcome the difficulties of manufacturing sheet lead having characteristics suitable for use as grids in batteries.

Other features and characteristics will become apparent in the following description which relates to the drawings.

Fig. 1 is a partial sectional view conventionally illustrating mechanisms for casting the lead sheets or grids, cooling means, paste applying means, feeding and pressing rollers, and a shear for cutting the plates apart; Fig. 2 shows the method of bringing a backing strip beneath the plate; Fig. 3 the mouth of the paste applying means; Fig. 4 the arrangement for placing a protecting strip at the upper side of the plates; Fig. 5 is a diagrammatical illustration of the strip of plates showing the relation of the plate to the strip; and Fig. 6 is an enlarged side elevation of my improved plate or electrode, showing the preferred arrangement of the voids or perforations for the paste.

As previously stated, the plates produced by my process are of very thin and of a crystalline material. As shown, these plates indicated at 10 comprise essentially outer frame members 8, forming the perimeter of the grids, and strengthening cross bars 9 integrally connected by vertical thin strips or bars 16, leaving openings or perforations 11 for the paste or active material. In practice, the relative dimensions of these parts may vary, but I have secured excellent results by making the sheets $\frac{1}{16}$ inch in thickness, the outside frame members about $\frac{3}{32}$ inch wide, while the perforations defined by the cross strips 9 and the bars 16 are about 1 inch high by $\frac{5}{32}$ inch wide, the thin ribs being approximately 1/40th inch wide. The terminal lugs 12 are continuations of the same thin strip or sheet integral with the upper portion of the frame of the grid.

Referring now to the process; in Figs. 1 to 5, 14 represents a revolving drum, on which is mounted a lead pot 15 and suitable means for maintaining the heating of the lead, as by electricity. Provision is made for cooling of the drum, so that the molten metal immediately congeals upon issuing from the mouth of the pot. On the surface of the drum may be gates, projections, cavities, etc., arranged to cast and form the grids described. By this means the grids are formed in a connected strip with the cross ribs and vertical bars as well as the terminal lugs completely defined and these grids need only to be severed. In the casting of very thin grids with certain alloys of lead, more accurate results may be sometimes attained by the use of dies for perforating and cutting the grids from a continuous uniform sheet strip of lead flowing from the gate of the lead pot. Such dies may be of any suitable mechanical construction, preferably synchronized with the rotation of the drums. For example, I have illustrated, in broken lines, a rotary punch member 16 and a coacting platen 17, one of these members being connected by gearing and a shaft, indicated at 18, to the shaft of the drum 14. Thus in one case, strips of connected plates designated 20, in Figs. 2, 3 and 4, flow from the gate of the plate 15 and follow the drum downwardly and lead through a guide 21 of cooling apparatus, consisting of a spray device 22, and a suitable receptacle 23. In the other case, namely, the punching operation, the strip 20 flowing from the gate is a flat sheet of cast lead which is formed by the shearing and punching action of the rolls 16 and 17 into the grids. A stripper 25 insures the separation of the strip of leaf lead, or the grids from the surfaces of the drum. A machine for casting thin lead sheets for this purpose is shown, described and claimed in my copending application Serial No. 423,309, filed November 11, 1920, entitled "Process and apparatus for casting sheet metal".

The strip of plates passes over a guide 28, over which a strip of paper 29, leading from a roll 26, and over a roller 27 progresses with the plate, forming a backing of supporting material beneath the strip of grids. The strip passes under the gate of a paste receptacle 24, having a lip 24ᵃ in close contact with the upper surfaces of the plates, acting to cause even filling of the openings by rubbing the paste flush with the upper side of the grid.

I desire to provide a thin sheet of paper or like material on each side of the plates, which may facilitate handling without danger of the active material falling away, i. e., these sheets of paper form films or retaining means. The strip 29 on one side, and the strip 30 on another side, lead under a roll 31 from a roller 32. Thus as the strip 20 advances, the surplus moisture of the active material may be squeezed out between rolls 33 and 34; this moisture, of course being absorbed by the paper. One of these rolls is shown as actuated by a ratchet and pawl connection indicated at 35, operated through an eccentric pin, not shown, on the fly wheel of a shear, indicated conventionally at 36, and connected by the link 37 leading to the ratchet arm. This shear may thus control the feeding of the strips and cause a movable knife indicated at 38 on a suitable vertical slide, to sever the individual plates from the strip 20. It is to be understood that this arrangement just described is merely illustrative of any suitable means for causing the shear to sever the strips along the proper line between the grids.

These plates may then be assembled to complete the battery.

From the foregoing, it will be seen that the active material is applied to the grids, which are formed in a continuous strip, by reason of the mouth of the receptacle 24 being held in close contact to the upper surface of the lead strip, whereby the material is rubbed into the plates, and the excess scraped off by the lip 24ᵃ. On account of the extreme thinness of the grids, the paste may be applied to the openings by feeding it entirely from one side, as no air will be trapped for two reasons; one being the thinness of the plates, and the other, the provision of the porous paper strip 29 beneath the plates. The strip 29 and the strip 30, placed on the upper side and of similar thin porous material (like news print paper), prevent the paste from adhering to the surfaces of the rolls 33 and 34. These rolls compress the paste somewhat, and squeeze out the surplus moisture, whereby, without any drying or soaking process these grids with their thin coatings of paper may be freely handled and subsequently assembled in the battery cells. That is, the plates with their thin paper coatings and the separators are arranged, positive and negative alternately, and the cell is then held tightly together, as by a large rubber band or similar means, while the paste is rendered active by the usual electrolysis.

The use of the strips of paper on each side of the plate, in no way interferes with the electrolytic action of the battery, because of the extreme thinness and porous character of these strips, in fact they are so thin that no attempt is made to show them in the drawings other than the conventional views illustrating the process. Of course, they may be removed if desired, but I find it more practical to leave them adhering to the sides of the plate and thus holding the active material, and simply assemble them together with the usual separators.

In addition, to the advantages of economy in the steps of the process of manufacture of a battery, I have accomplished still other advantages of considerable value, such, for example, as the elimination of expensive equipment and skilled labor. Highly skilled labor is required in making the thick grids and pasting them by hand, and the grooved separators incident to the thick grids are much more expensive than my plain, ungrooved type of separator. The thin lead leaf or similar formed alloy effects at once a material saving in cost of the grids, and I have no difficulties resulting from the buckling or short circuiting of the plates while in use.

Various modifications may be made in my battery construction and process of manufacture without departing from the spirit of my invention.

I claim:—

1. The steps in the process of manufacturing a storage battery of the pasted type, consisting in placing a sheet of connected grids on a sheet of material with close contact between the bottom of the grid and the said sheet, adding paste to the interstices in said grid through the top while the sheet prevents such material escaping through the bottom, and cutting said sheet of grids into single units.

2. The process of manufacturing a storage battery of the pasted type, including filling the openings in a perforated sheet of lead from one side thereof while backing the other side of the plate, causing relative movement between the receptacle for the paste and the plate, while causing close contact of a mouth or spout of the receptacle with one side of the sheet.

3. The process of manufacturing a storage battery of the pasted type, including the step of filling a perforated thin sheet of lead not greater than one sixteenth of an inch thick, and have its openings extending uniformly therethrough, the filling being accomplished by forcing the material into one side of the sheet while backing the other side with paper to limit the flow of the paste.

4. The process of manufacturing storage battery plates, consisting of forming a continuous strip of metal with openings through it, surmounting the same on a strip of paper, applying paste to the openings of the strip while so mounted, the paper preventing escape of the paste, and thereafter cutting the strip into battery plates.

5. The steps in the process of manufacturing storage battery plates consisting of casting a continuous strip of metal, mechanically perforating the strip to form paste receiving interstices, superposing the strip upon a continuous strip of fibrous material to support the paste when applied to said plate, filling the interstices with paste, superposing a sheet of fibrous material upon the strip, subjecting the paste in the interstices of the strip to pressure to cause the paste deposited therein to conform to the thickness of the metallic strip and to remove the superfluous liquid therefrom, and shearing the strips and said paste supporting material into battery plate units.

6. The process of manufacturing storage battery plates of the pasted type consisting of casting a continuous strip of thin sheet lead, perforating the strip of lead to form a plurality of connected battery plates, superposing the strip upon a strip of paper and applying battery paste to the interstices formed therein while the paper prevents the escape of such paste, whereby shearing of the strip completes the manufacturing of the plates.

7. The steps in the process of manufacturing storage battery plates consisting of casting a continuous strip of thin sheet lead, mechanically perforating the strip of lead to form paste receiving interstices, superposing the strip upon a continuous strip of supporting material to close the perforations thus formed, filling the interstices with paste, subjecting the paste in the interstices of the strip to cause the paste deposited therein to conform to the thickness of the metallic strip and severing the strip and said paste supporting material into battery plate units.

8. The steps in the process of manufacturing storage battery plates consisting of forming a continuous strip of thin sheet lead, successively thereafter forming contours and interstices on the sheet and which comprise battery plates connected in a strip, thereafter applying battery plate paste to the interstices while the plates are so connected and thereafter severing the strip into individual battery plates.

9. The process of manufacturing storage battery plates consisting of forming a continuous strip of thin sheet lead, punching interstices in the strip by successive operations and thereby shearing a side margin of the strip in conformity with each group of interstices whereby a plurality of connected plates is formed, superposing the perforated metallic strip upon a strip of paper, applying paste on the top side of the strip to fill the respective interstices, and shearing the strip into plate units together with the paper whereby the paste may be supported in the interstices of the battery plates by the paper during a subsequent drying and electrolytic forming process.

10. The process of manufacturing storage battery plates consisting of forming a continuous thin metallic strip, forming interstices in the strip by successive operations whereby a plurality of connected plates is formed, superposing the perforated metallic strip upon a paste supporting strip of material, applying paste on the top side of the metallic strip to fill the respective interstices, and shearing the strip into plate units together with the paste supporting material whereby the paste may be supported in the interstices of the battery plates during a subsequent forming process.

11. The process of manufacturing storage battery plates of the class described, consisting of casting a thin lead strip not more than one-sixteenth of an inch in thickness, punching a series of groups of interstices in the strip whereby a plurality of connected battery plates is formed in the strip, filling the plate openings thus formed with battery plate paste while supporting the under side of the strip with paper, passing the strip through sizing rollers whereby paste in the interstices thereof may be sized to the thickness of the plate and shearing the strip into plate units.

12. The process of manufacturing storage battery plates, consisting of casting a thin continuous lead strip, then after the same has cooled, punching a series of groups of openings in the strip, then causing the punched strip to travel along a support and filling the openings in the strip with battery paste while it is traveling, and thereafter shearing the strip between the groups of interstices to make separate battery plates.

13. The steps in the process of manufacturing storage battery plates, consisting of casting a continuous strip of metal, mechanically perforating the strip to form paste receiving openings, super-imposing the strip upon a movable medium resting on a support, filling the interstices with paste applied from above against the medium, while the strip and medium are moving and thereafter shearing the strip and medium periodically to make separate battery plates.

14. The process of manufacturing storage battery plates of the pasted type, consisting of casting a continuous strip of thin sheet lead to form a plurality of connected battery plates, superposing the strip upon a strip of paste supporting medium, applying battery paste to the interstices formed therein and severing the strip and supporting medium to obtain battery plate units.

In testimony whereof, I hereunto affix my signature.

CLARENCE W. HAZELETT.